United States Patent Office 3,558,197
Patented Jan. 26, 1971

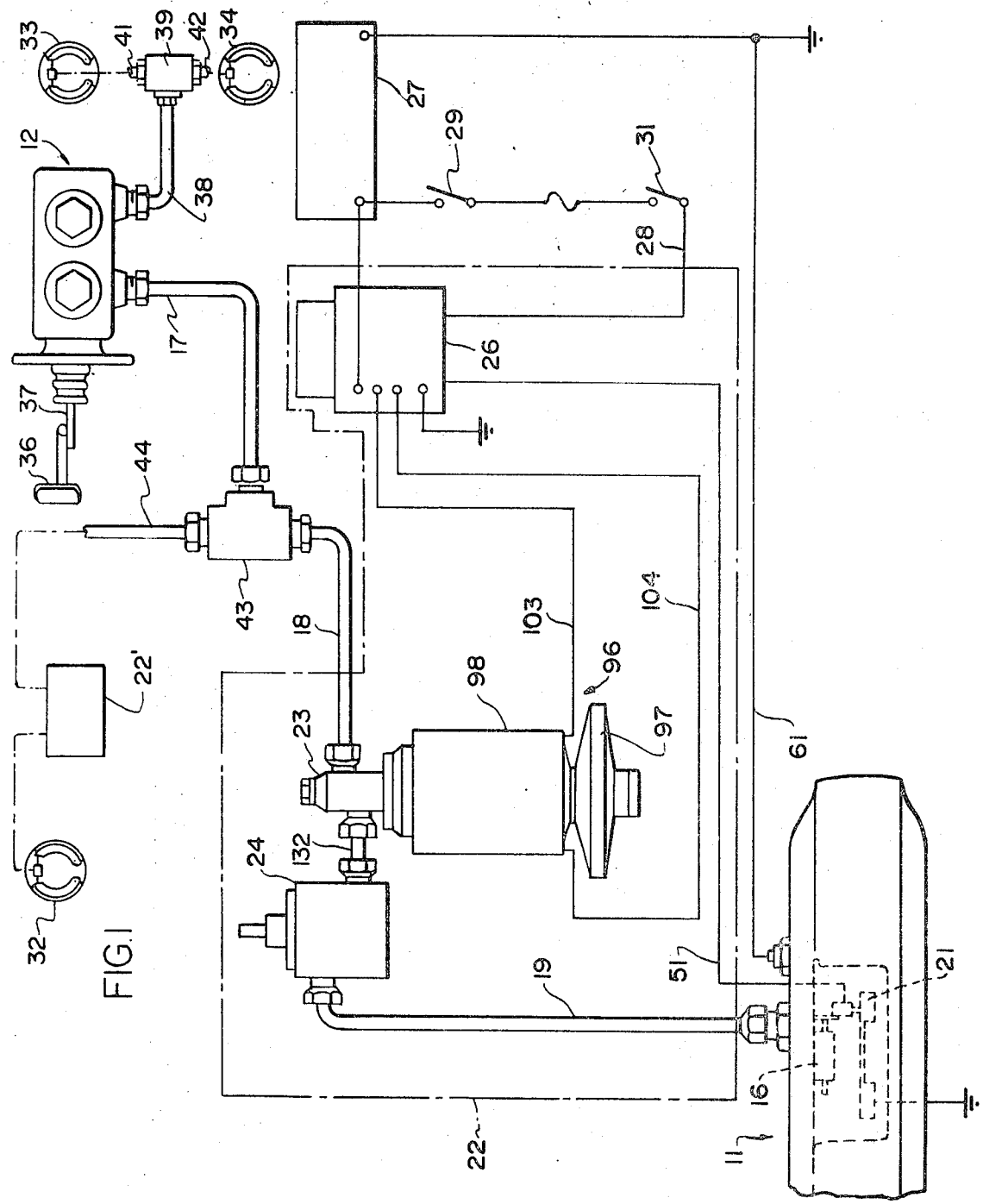

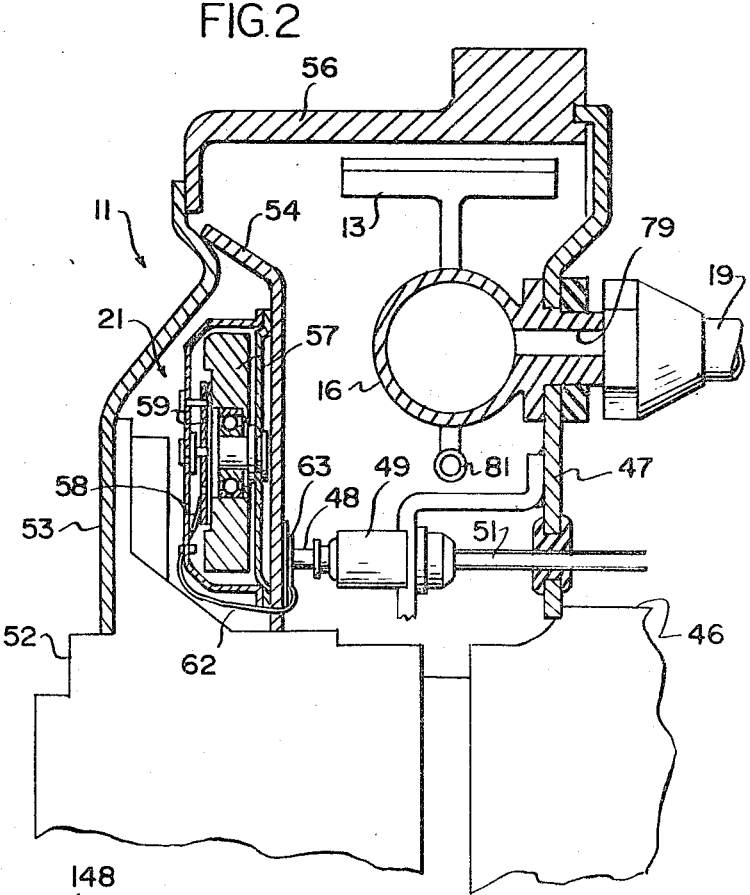
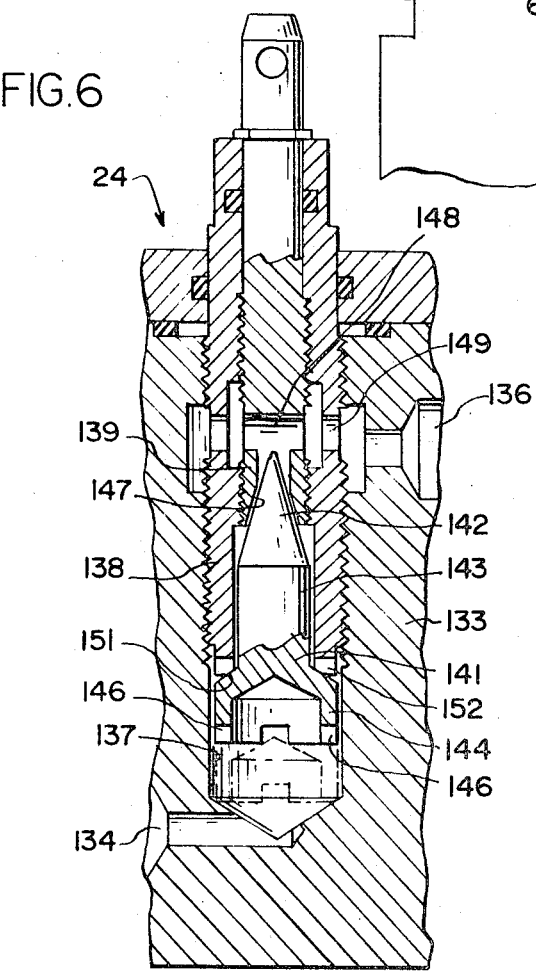

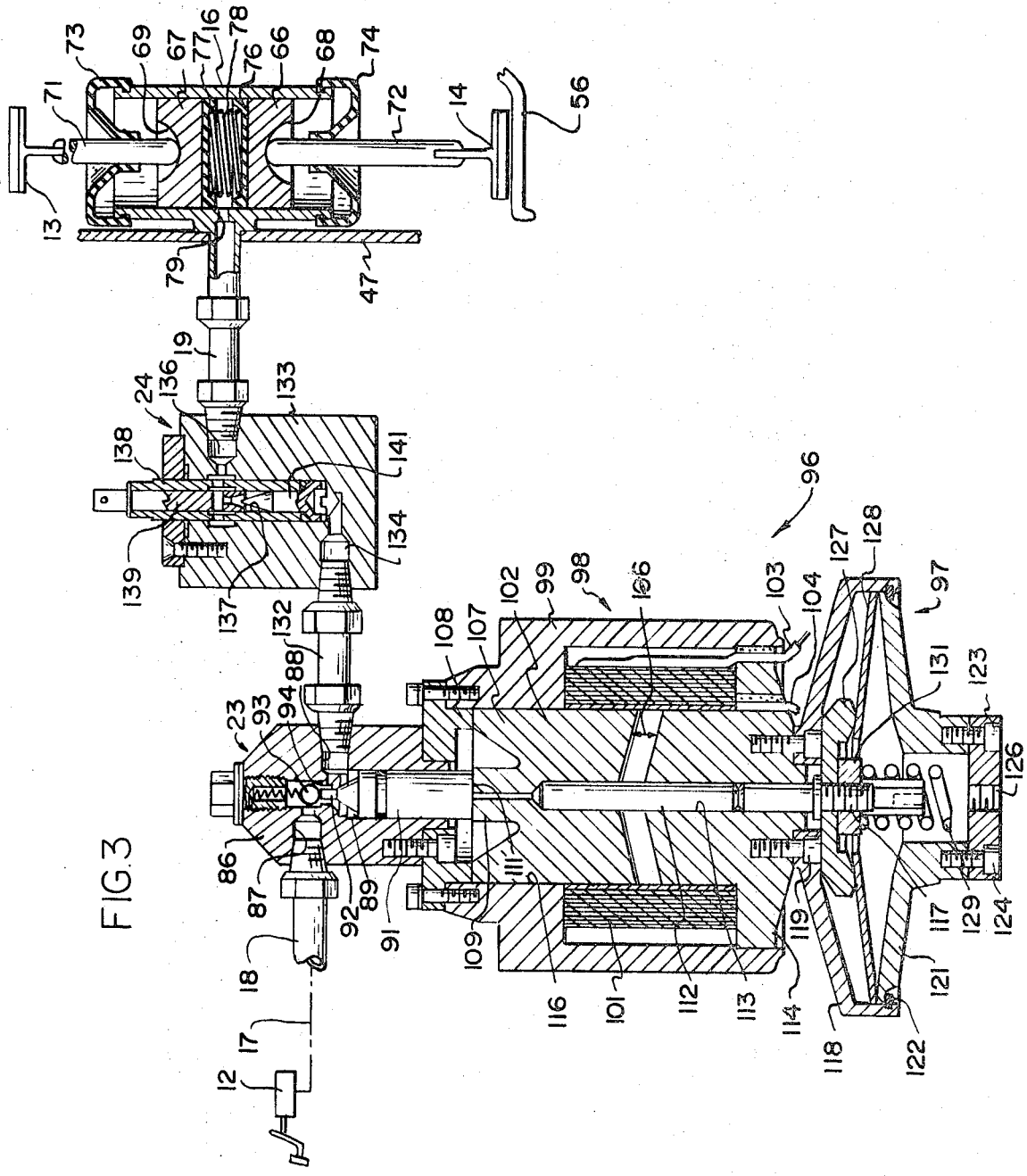

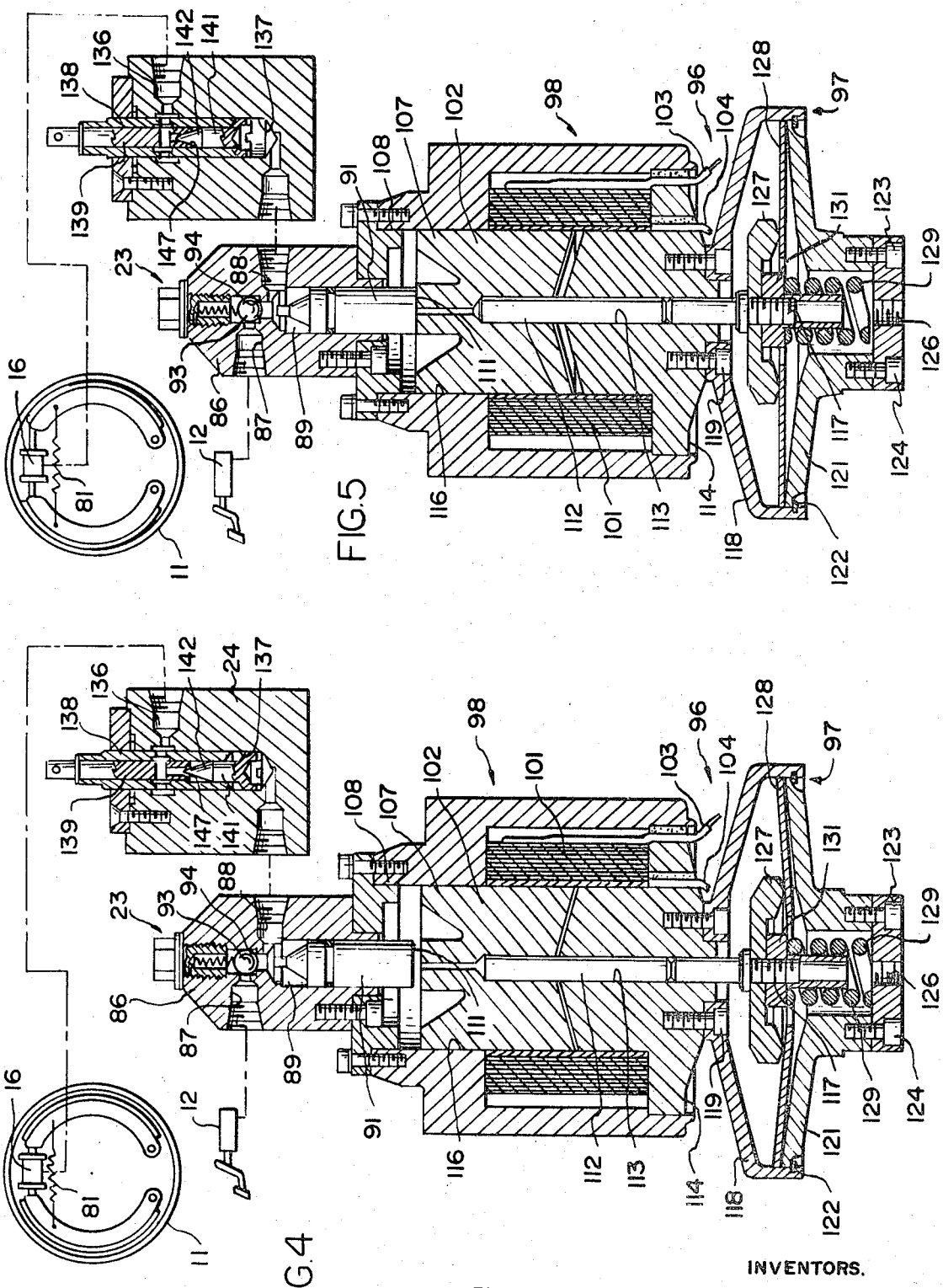

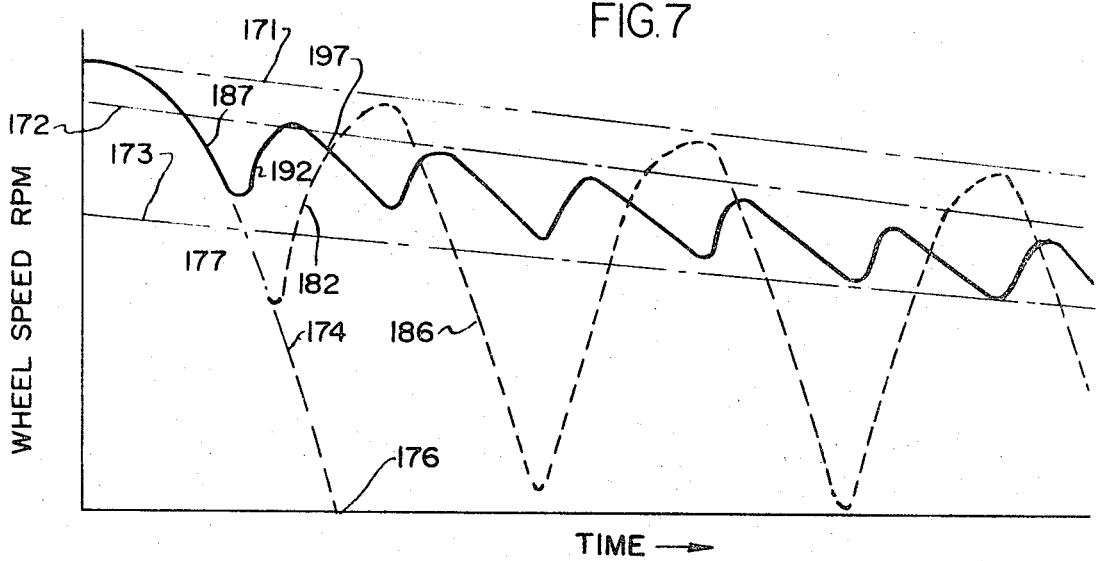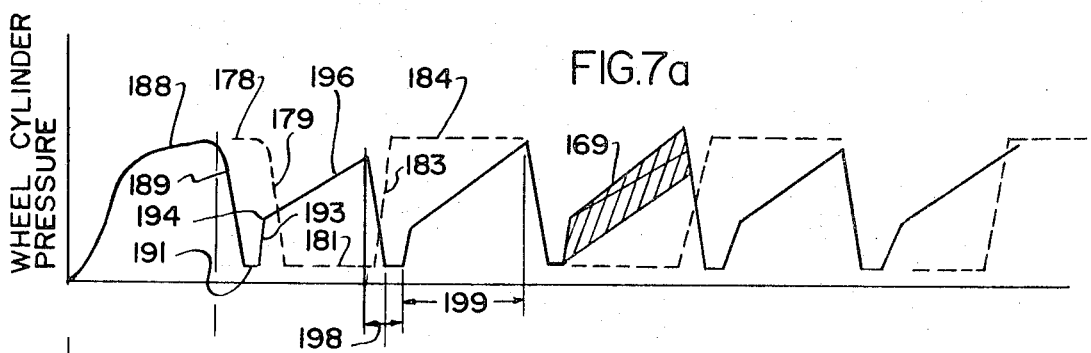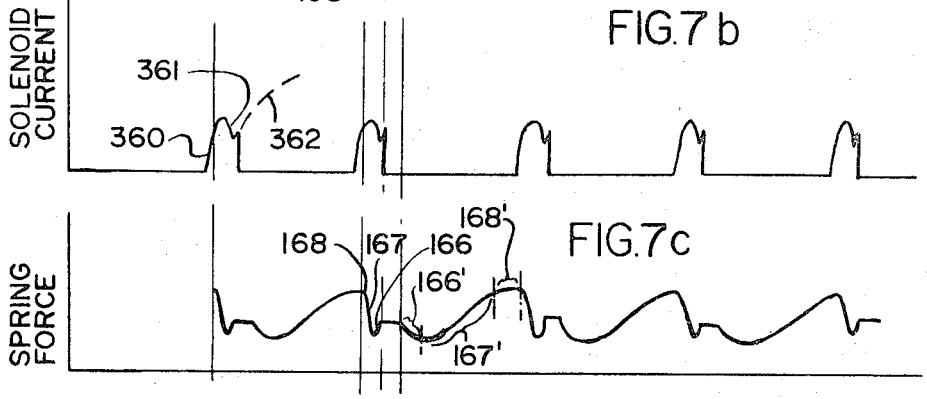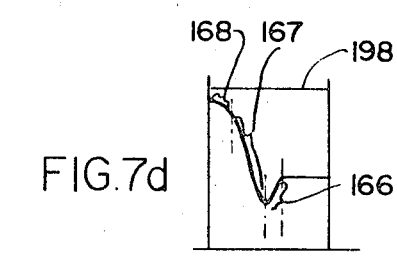

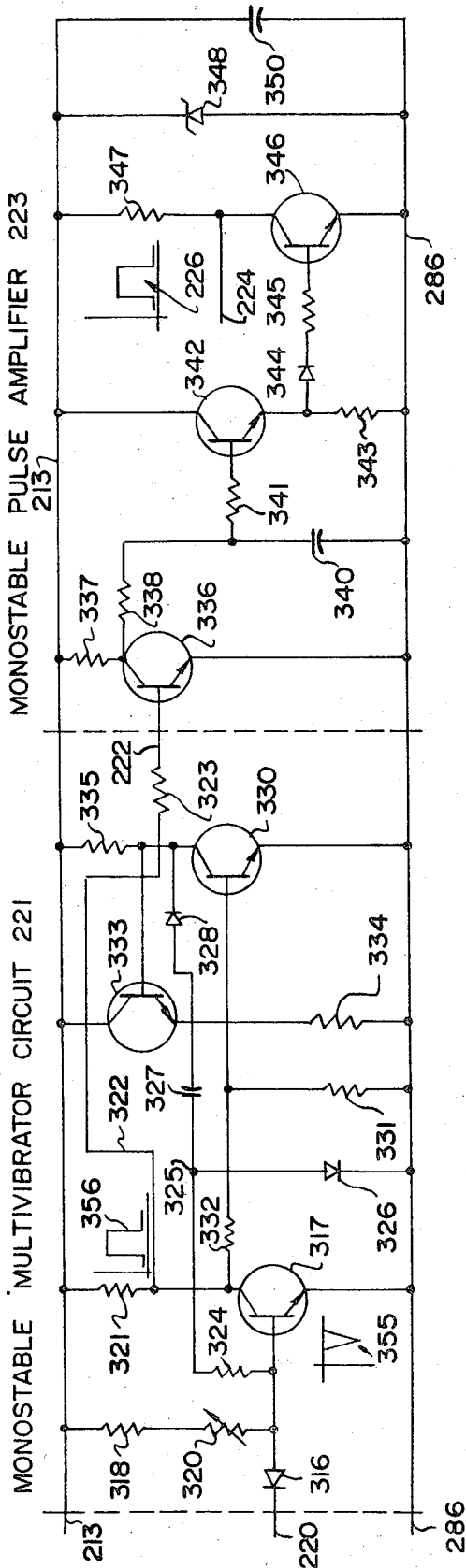
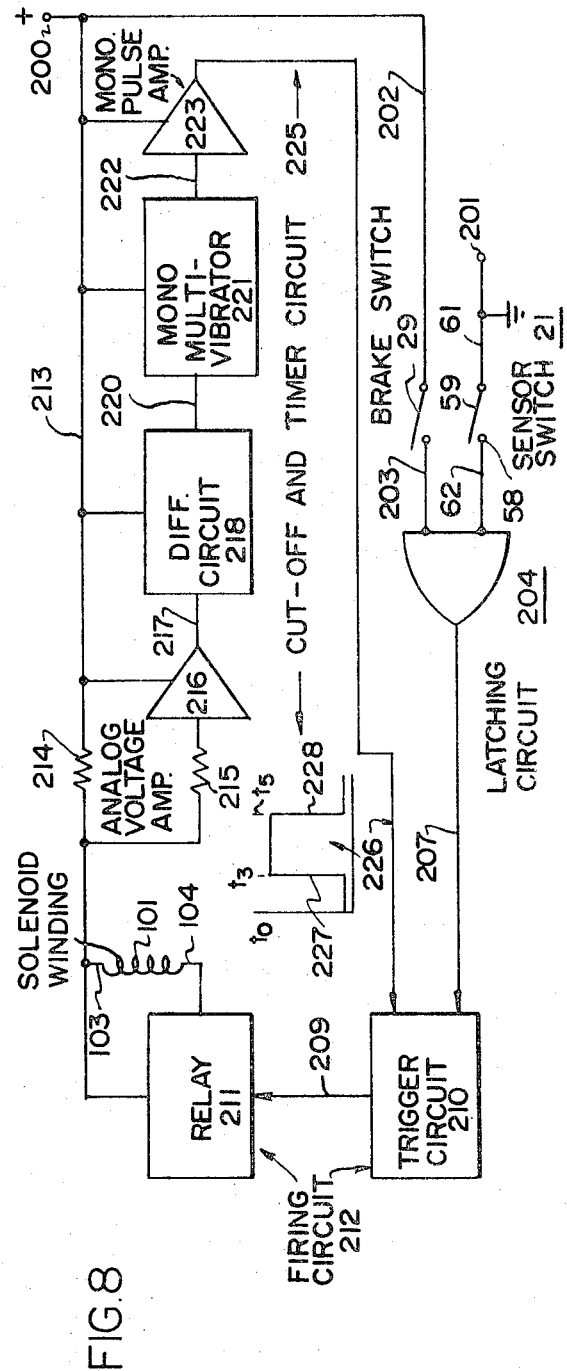

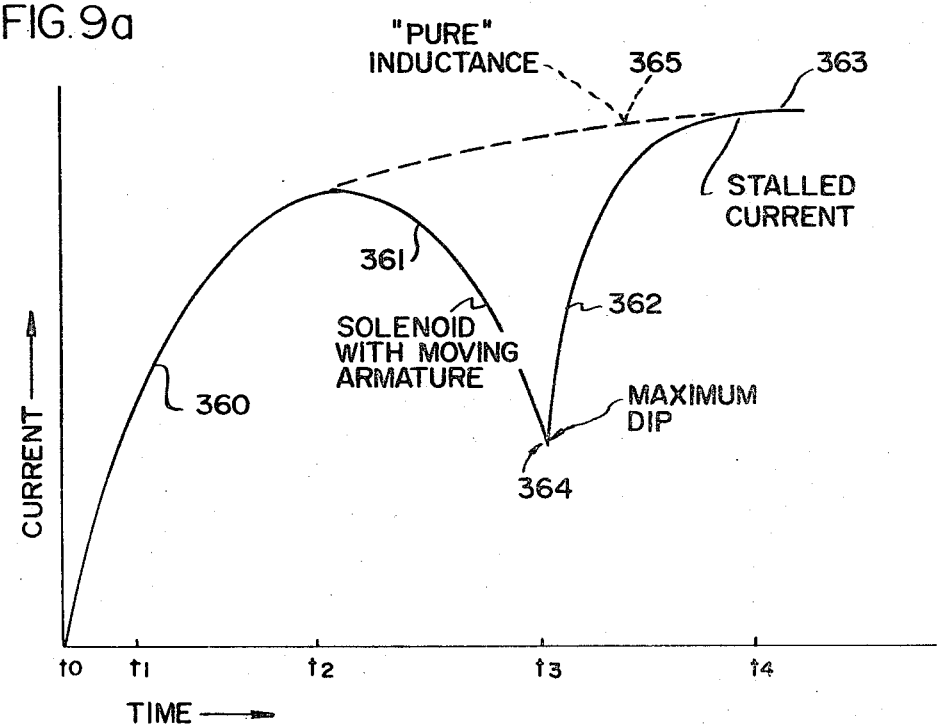
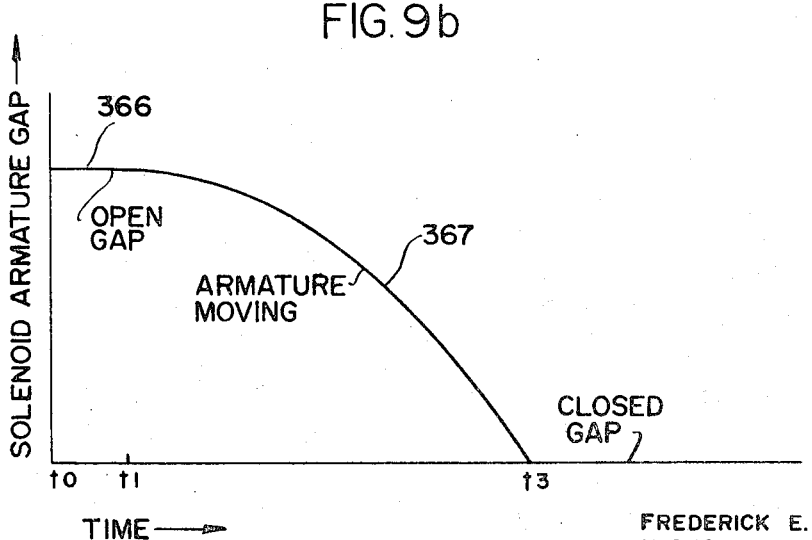

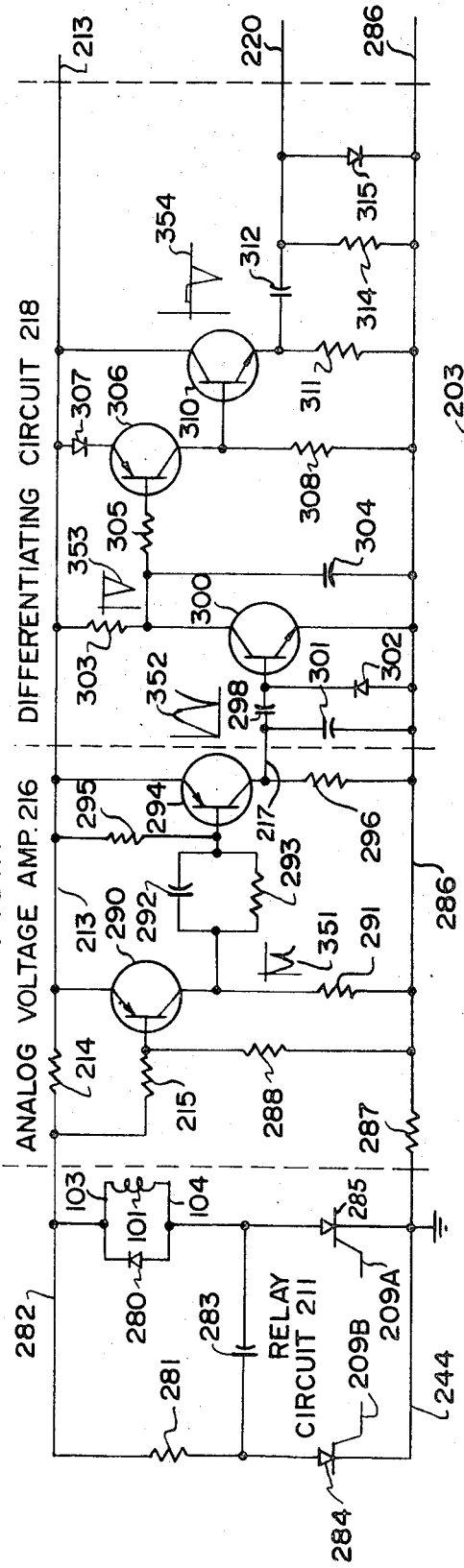

3,558,197
VEHICLE BRAKING SYSTEM
Frederick E. Lueck, Birmingham, and Michael J. Denholm, Dearborn Heights, Mich., and William J. Borowski, Crestwood, Steven M. Kroml, Summit, and Michael A. Gasperi, Homewood, Ill., assignors to Borg-Warner Corporation, Chicago, Ill., a corporation of Delaware
Filed Sept. 25, 1968, Ser. No. 762,382
Int. Cl. B60t 8/08
U.S. Cl. 303—21    18 Claims

ABSTRACT OF THE DISCLOSURE

A braking system is provided with antiskid means including reciprocating apparatus for lowering and raising the pressure in a hydraulic brake cylinder by cyclically releasing and returning fluid from and to the brake cylinder. The frequency at which fluid is released is determined by a pulse generating circuit. The pressure exerted during the return of fluid to the cylinder is determined by a linear spring motor having a compound spring rate. The rates of pressure drop and pressure rise in the brake cylinder are regulated by a flow control valve having a variable orifice permitting rapid pressure drop and gradual pressure rise.

SUMMARY OF THE INVENTION

The present invention relates generally to a braking system and more particularly to a system providing improved control of the applied braking force.

Braking systems heretofore have been provided with apparatus for cyclically releasing and reapplying the braking force in order to prevent uncontrolled skidding of a vehicle as a result of a locked wheel. Such prior systems are capable of releasing the braking force in response to an impending locked wheel condition and reapplying the braking force after the wheel has regained a sufficient measure of rotational speed.

It is an object of the present invention to provide an improved braking system for bringing a vehicle to a stop in the minimum distance while avoiding lateral skidding. A further object of the invention is to provide an improved antiskid braking system for maintaining the rotational speed of a braked wheel within a small range of variation corresponding to a preferred range of wheel to road adhesion.

The improved braking system of the present invention includes apparatus for repeatedly releasing and reapplying the braking force according to a preprogrammed sequence which is set in motion by an initial impending locked wheel signal and maintained in operation while the vehicle brake pedal remains depressed. In addition, the present improved braking system provides for rapidly releasing the braking force, but reapplies the braking force at a controlled and programmed rate. This rapid release and gradual reapplication of the braking force assists in maintaining the rotational speed of the braked wheel within a range corresponding to a preferred wheel to road adhesion which provides both a minimum stopping distance and a high degree of resistance to lateral skidding.

Other objects and advantages of the present invention will become apparent from a consideration of the accompanying drawings together with the following description.

BRIEF DESCRIPTION OF THE DRAWINGS

FIG. 1 is a schematic diagram of a braking system including skid inhibiting means according to the present invention;

FIG. 2 is a fragmentary view, in section, of a braked wheel showing braking members and a deceleration sensor associated therewith;

FIG. 3 is a fragmentary view of a portion of the improved braking system according to the present invention;

FIGS. 4 and 5 are similar to FIG. 3 showing elements of the improved skid inhibiting apparatus positioned for release and return of fluid from and to a brake cylinder;

FIG. 6 is an enlarged fragmentary view of a portion of the apparatus shown in FIG. 3;

FIGS. 7 and 7a are graphical representations of wheel speed and brake cylinder pressure plotted as a function of time;

FIG. 7b is a graphical representation of pulse current plotted against time;

FIG. 7c is a graphical representation of spring force plotted against time;

FIG. 7d is an enlarged fragmentary view of a portion of FIG. 7c;

FIG. 8 is a block diagram of the solid state controller, solenoid winding, brake and sensor switches;

FIGS. 9a and 9b are graphical illustrations useful in understanding solenoid operation; and FIGS. 10, 11 and 12 are schematic diagrams which together depict details of the circuits shown generally in FIG. 8.

DESCRIPTION OF THE PREFERRED EMBODIMENT

Referring now to the drawings and more particularly to FIGS. 1–3, there is schematically shown a portion of a braking system 10 for a wheeled vehicle, which for purposes of clarity in illustration is shown in connection with a wheel 11 thereof. Braking system 10 includes a source of fluid pressure such as master cylinder 12, braking members 13, 14 actuatable by means of brake cylinder 16, and a fluid pressure circuit 17, 18, 19, connected between brake cylinder 16 and master cylinder 12. Wheel 11 has a deceleration sensor 21 arranged to provide a signal of an impending wheel skid by sensing an incipient locked wheel condition before the wheel has actually stopped rotating.

An electrically operated skid inhibiting means 22 is provided for actuating pressure modulating apparatus 23, 24 in response to an impending skid signal from sensor 21. A controller 26 is connected to a source of electrical current such as a storage battery 27 for providing timed operation of skid inhibiting means 22. Controller 26 is connected to sensor 21 and to the vehicle electrical circuit 28 such that operation of skid inhibiting means 22 can be conditioned upon the occurrence of an impending skid signal while both brake switch 29 and vehicle key switch 31 are closed.

While it is desirable to provide a complete skid inhibiting system for each of the wheels of a vehicle, it has been found that considerable benefit can be realized with simpler arrangements. For example, the rear wheels of a four wheeled vehicle may be provided with individual skid inhibiting systems or the rear wheels may be provided with common pressure modulating apparatus operable in response to either of a pair of wheel sensors.

The various elements of the above braking system are described in more detail in the following paragraphs.

The fluid pressure source 12 is preferably a master brake cylinder of a type usually provided in motor vehicles, and if desired, may be equipped with power assist apparatus also of a type often provided in motor vehicles. A dual master cylinder is illustrated in which a foot pedal 36 is connected for actuating a plunger 37 providing fluid under pressure to both conduits 17 and 38. Conduit 38 is connected through a T 39 to branch conduits 41, 42 which provide fluid for braking a pair of wheels 33, 34 such as the front wheels of a four wheeled vehicle. Skid inhibiting means may be installed in branch conduits 41 and 42 if desired. Conduit 17 is connected through another T 43 to branch conduits 18 and 44, branch conduit 18 being connected to wheel 11 through the skid inhibiting means 22. Branch conduit 44 is arranged for connection to an opposite wheel 32 through a similar skid inhibiting means 22'. It is desirable to provide skid inhibiting apparatus for each transverse pair of wheels on the vehicle, however, it has been found that highly effective skid control can be realized by providing skid inhibiting means for the rear pair of wheels in a four wheeled motor vehicle.

Wheel 11 includes a nonrotatable member 46 and backing plate 47, to which is secured braking cylinder 16 and braking members 13, 14. A brush 48 and holder 49 are also secured to nonrotatable backing plate 47. An electrical conductor 51 is connected between brush 48 and controller 26. Wheel 11 also includes a rotatable hub 52, and a pair of annular disk members 53, 54 extending outwardly toward a brake drum 56.

Sensor 21 is mounted on annular disk 54 and includes a rotational inertia element 57 frictionally coupled to one of a pair of switch contacts 58, 59. Switch contact 59 is connected to electrical ground through conductor 61, while switch contact 58 is connected to brush 48 through conductor 62 and slip ring 63. Switch contacts 58, 59 are normally biased in the open position and are driven to a closed position by inertia element 57 when wheel 11 is decelerated beyond a predetermined value. The deceleration value at which switch contacts 58, 59 close is selected in accordance with the braking capability of a particular vehicle in which the sensor is employed. The sensor is therefore able to provide a signal of an impending skid before the wheel has actually stopped rolling. While a particular deceleration sensor has been described, other suitable sensors may be employed if desired.

Brake cylinder 16 includes a pair of pistons 66, 67 having sockets 68, 69 in the outer faces thereof bearing against push rods 71, 72 which engage braking members 13, 14. Each end of brake cylinder 16 is provided with a cover 73, 74 through which push rods 71, 72 extend. A pair of cup seals 76, 77 are held against the inner faces of pistons 66, 67 by means of a spring 78. A port 79 is connected to conduit 19 for admitting fluid from the fluid circuit into cylinder 16. As pressure in conduit 19 increases, fluid is admitted to cylinder 16 urging pistons 66, 67, push rods 71, 72, and brake shoes 13, 14 outwardly for applying braking force to brake drum 56. As pressure in conduit 19 decreases, spring 81 urges brake shoes 13, 14 inwardly away from brake drum 56, moving push rods 71, 72 and pistons 66, 67 inwardly expelling fluid from cylinder 16 into conduit 19. The brake cylinder and braking members described above are typical of a form of braking construction provided in automotive vehicles, many alternative constructions also being available with which the antiskid system of the present invention is useful.

Skid inhibiting means 22 includes reciprocable fluid transfer means 23 for cyclically applying and releasing fluid to and from brake cylinder 16, and a flow control valve 24 for regulating the rate of pressure change in cylinder 16.

Fluid transfer means 23 has a body 86 defining an inlet port 87, and outlet port 88, and an expansion chamber 89. A piston 91 is reciprocable in expansion chamber 89 and includes a projection 92 engaging a check valve member 93. Under normal braking conditions, piston 91 is biased to a normal position as illustrated in FIG. 3 in which check valve member 93 is held off its seat 94 by the projection 92 allowing fluid flow between ports 87 and 88.

Referring to FIGS. 3, 4 and 5, piston 91 is engageable with a reciprocable linear motor 96 including a spring motor 97 and an electromagnetic motor 98.

Linear electromagnetic motor 98 includes a frame 99, a solenoid 101, and a movable armature 102. The winding of solenoid 101 is connected by conductors 103, 104 to controller 26. When solenoid 101 receives a pulse of current from controller 26, an electromagnetic flux field is generated which causes armature 102 to move through a stroke closing the gap 106. Armature movement in a direction for closing gap 106 provides a fluid release stroke for releasing fluid from brake cylinder 16 and simultaneously cocks spring motor 97. Upon the cessation of the current pulse from controller 26, the electromagnetic flux field decays, permitting spring motor 97 to drive armature 102 in the opposite direction for reopening gap 106, providing a fluid return stroke.

Armature 102 has an annular shoulder 107 engageable with a mating annular shoulder 108 of frame 99 limiting the extent of armature movement in one direction. Armature 102 also has an abutment 109 engageable with an end face 111 of piston 91. A push rod 112 projects from armature 102 and extends through a bore 113 in motor frame end member 114. Push rod 12 is secured to armature 102 and is slidable in bore 113 for reciprocable movement as armature 102 moves back and forth in cavity 116 in motor frame 99. Push rod 112 has a threaded portion 117 extending into spring motor 97 providing a connection therewith.

Spring motor 97 has a housing 118 secured to motor frame end member 114 by cap screws 119. A reaction member 121 is secured to housing 118 by means of snap ring 122. End cap 123 is fastened to reaction member 121 by means of cap screws 124, and includes an access aperture 126 provided with threads for receiving a closure plug if desired.

Spring motor 97 also includes a large annular collar 127 mounted on the threaded portion 117 of push rod 112. A diaphragm spring 128 bears against collar 127 near an inner circumference, while the perimeter thereof bears against reaction member 121. Diaphragm spring 128 is preferably of an over-center type which provides substantially constant or slightly rising resisting force during a first stage of flexure and thereafter offers decreasing resisting force as further flexure takes place.

In addition to diaphragm spring 128 and collar 127, spring motor 97 includes auxiliary spring 129 engaging small collar 131. Auxiliary spring 129 preferably has a free length less than the open gap distance between collar 131 and end cap 123, such that the major portion of the gap closing stroke is governed by diaphragm spring 128. Auxiliary spring 129 preferably offers increasing resistance as flexure occurs. It, however, is not subjected to flexure until near the end of the cocking stroke. The compound spring motor thus provides for accelerated movement of the armature as a result of the negative spring rate of diaphragm spring 128 and also provides for absorbing the kinetic energy of the moving armature near the end of the cocking stroke by means of the positive rate of auxiliary spring 129. The energy provided by the accelerated armature is resiliently stored in auxiliary spring 129 and diaphragm spring 128, quickly returned to the armature in the opposite direction serving to initiate rapid return of armature 102 opposing the tendency of armature 102 to dwell in the closed gap position while the flux field is decaying.

Reciprocable linear motor 96 is thus provided with means for assuring rapid movement of the fluid transfer means in both directions. The magnetic flux field acting between solenoid 101 and armature 102 provides increasing attracting force as movement occurs in the cocking direction while the diaphragm spring is decreasing in resistance as such movement occurs. The excess force thus available, provides accelerated armature movement resulting in a rapid fluid releasing stroke. The auxiliary spring 129 returns energy to the armature for rapidly initiating the fluid return stroke.

Flow control valve 24 is illustrated as a separate element connected to fluid transfer means 23 by a conduit 132, however, it may be incorporated into the body 86 of fluid transfer means 23 if desired. Flow control valve 24 includes a body 133 having inlet port 134 and outlet port 136 communicating with an internal passage 137.

Concentric sleeves 138, 139 are longitudinally adjustable within passage 137 by means of screw threads. Referring to FIG. 6, movable valve member 141 is located within valve body 133 for cooperation with passage 137 and each of sleeves 138, 139. Valve member 141 has a tapered nose portion 142 extending from a generally cylindrical body portion 143 which merges into a hollow skirt portion 144 having flow apertures 146. Valve member 141 is biased to a position in which skirt portion 144 normally rests on the bottom of passage 137. As shown in the drawings, the valve body 133 is oriented vertically such that valve member 141 is biased to the desired position by gravity, however, a spring may be employed to urge valve member 141 to the desired position where greater latitude is desired in positioning the flow control valve 24.

Inner concentric sleeve 139 is provided with a conical seat 147 cooperating with tapered nose portion 142 to define an orifice for controlling fluid flow through internal ports 148, 149 and outlet port 136. Internal sleeve 139 is longitudinally adjustable within outer sleeve 138 for selecting the size of the orifice provided by nose portion 142 and seat 147.

Outer concentric sleeve 138 is longitudinally adjustable in valve body 133 and includes an annular abutment 151 engageable with skirt portion 144 of movable valve member 141. Flow apertures 152 are provided in annular abutment 151. Adjustment of outer sleeve 138 with respect to valve body 133 determines the length of travel permitted to movable member 141, while adjustment of inner sleeve 139 with respect to outer sleeve 138 determines the size of the orifice. Although inner and outer sleeves 139 and 138 are shown as being adjustable, in practice it would be desirable to provide a tamper proof construction of the flow control valve 24 which is preset for the vehicle in which it is to be employed.

Under normal operating conditions in the absence of an incipient skid condition, valve member 141 is maintained at rest against the bottom of passage 137 permitting maximum flow of fluid through the passage toward and from conduit 19 and brake cylinder 16. However, an excess rate of flow toward brake cylinder 16 caused by the return stroke of piston 91 and armature 102 results in movement of valve member 141 upwardly in passage 137 as shown in FIG. 6. Nose portion 142 and seat 147 then provide a decreasing orifice, restricting flow to brake cylinder 16 resulting in increasing the time interval during which increasing braking force is applied to the wheel. When fluid is released from brake cylinder 16, flow occurs through passage 137 in the opposite direction urging valve member 141 to its normal position increasing the orifice size such that flow away from brake cylinder 16 is essentially unrestricted, allowing pressure release in a very short time interval.

A type of flow control valve known as an "orifice check valve" may be employed instead of the flow control valve 24, if desired. Briefly described, an exemplary "orifice check valve" provides restricted flow toward the brake cylinder and substantially unrestricted flow from the brake cylinder. Where such a valve is normally biased to provide restricted flow, the fluid is returned to the brake cylinder at a constant rate such that the pressure rise characteristic in the cylinder would be represented as a straight line having a slope within the shaded area 169 of FIG. 7a. Biasing an "orifice check valve" to provide restricted flow thus eliminates the knee portion 194 of the pressure rise curve as shown in FIG. 7a.

Having thus described the structural elements of a preferred form of the apparatus, the nature of the invention can be even more fully appreciated by considering the operation of the braking system with reference to FIGS. 3, 4, 5 and 7.

OPERATION OF THE PRESSURE MODULATING APPARATUS

In order to more fully explain the beneficial results achieved by the skid inhibiting means of the present invention, the operation of various components of the braking system are illustrated in graphical form in FIGS. 7-7d.

FIG. 7 illustrates various braking conditions in terms of wheel rotational speed plotted against time. Line 171 represents the velocity of a vehicle which is being brought to a stop in the minimum time and stopping distance permitted by the road surface, shown in terms of the rotational speed of an unbraked wheel, such as a fifth wheel type speed measuring device. Lines 172 and 173 represent a preferred slip range for a braked wheel of a vehicle, which results in bringing the vehicle to a stop in the minimum time and stopping distance. The preferred slip range corresponds with wheel to road adhesion in which the wheel approaches maximum effectiveness in retarding the vehicle and maintaining lateral stability. Curve 174 represents the characteristic performance of a braked wheel controlled by a vehicle driver under so-called panic conditions and illustrates the occurrence of a locked wheel condition at the intersection point 176. Beyond the point 176, the vehicle wheel can slide sideways as easily as forwardly resulting in an uncontrolled skid in which the path followed by the vehicle is determined by random dynamic forces beyond the control of the vehicle driver.

Broken line curves 177, 182, 186 represents the rotational speed of a braked wheel achieved by prior art devices where the brakes are reelased in response to a deceleration signal indicating an impending locked wheel condition and reapplied after the wheel has regained sufficient rotational speed to avoid immediate locking of the wheel when the brakes are reapplied. Comparison of FIGS. 1 and 7a is helpful in relating the performance of the braked wheel with pressure migrations in the brake cylinder. The broken line curves 178, 179, 181, 183, 184 represents pressure changes in a brake cylinder corresponding to the whel speeds represented by curves 177, 182, 186. Pressure curve portions 179 and 181 represent the pressure existing in the brake cylinder when fluid is released therefrom, and correspond to wheel speed curve portion 182 in which the wheel is being brought up to speed again. Pressure curve portions 183, 184 represent the pressure existing in the brake cylinder when the brakes are reapplied and correspond with the wheel speed curve portion 186.

Solid line curves 187, 192, 197, represents the rotational speed of a braked wheel where the brakes are repeatedly applied and released under the control of the skid inhibiting means 22 of the present invention, and curves 188, 189, 191, 193, 196 represents the corresponding pressure variations in the brake cylinder.

Pressure curve portions 189, 191 represent the pressure existing in the brake cylinder when fluid is released therefrom and correspond to the portion 192 of the wheel speed curve. Pressure curve portions 193, 196 represent the pressure rise in the brake cylinder as the brakes are reapplied ad correspond with wheel speed curve portion 197. The interval 198 represents to scale a time interval during which the brakes are released by the skid inhibiting means 22, and the interval 199 represents to the same scale the time interval during which the brakes are reapplied by the skid inhibiting means 22.

Comparison of pressure curve portions 189 and 179 shows that skid inhibiting means 22 permits relief of pressure in the brake cylinder as quickly as prior systems, while comparison of pressure curve portions 191 and 181 shows that reapplication of the brakes is initiated much more quickly with the system according to the present invention. Comparison of the pressure rise curve portions 193, 196 with the prior pressure rise curve 183 indicates that the present invention provides for gradual increase of pressure in the brake cylinder as the brakes are reapplied. Flow control valve 24 is provided with adjustable concentric sleeves 138, 139 for selecting the optimum pressure rise characteristics in the brake cylinder. Pressure rise curves 193, 196 indicates a desirable pressure rise curve obtainable with the flow control valve 24. The shaded area 169 represents a desirable range of pressure rise curves, one of which will provide optimum system performance for a particular vehicle. An orifice check valve may be employed in place of flow control valve 24 to provide pressure rise characteristics within the shaded area 169.

Referring now to FIGS. 3, 4 and 5, the operation of reciprocable fluid transfer means 23 and flow control valve 24 will be described in terms of a braking sequence. In FIG. 3, valve member 141 and piston 91 are shown in the normal or unactuated positions permitting normal operation of the brakes. During normal operation, fluid under pressure flows from master cylinder 12 through conduits 17, 18, ports 87, 88, conduit 132, port 134, passage 137, port and conduit 19, to brake cylinder 16.

FIG. 4 illustrates conditions resulting from an impending skid signal provided by sensor 21. An impending skid signal causes controller 26 to provide a pulse of current to solenoid coil 101 which in turn withdraws armature 102 from piston 91, simultaneously cocking spring motor 97. Check valve member 93 is moved against seat 94 isolating master cylinder 12 from wheel cylinder 16. While armature 102 is moving in the cocking direction, piston 91 is free to move in expansion chamber 89 allowing release of fluid from cylinder 16 through flow control valve 24 into the expansion chamber 89. During this cocking or fluid release stroke, the pressure curve portions 189, 191 while the wheel speed increases as indicated by curve portion 192. During the cocking stroke, auxiliary spring 129 has been compressed for quickly initiating a fluid return stroke.

During the fluid return stroke, the armature 102 is moved against piston 91 expelling fluid from expansion chamber 89 toward wheel cylinder 16. The return stroke is initiated by auxiliary spring 129 and continued by diaphragm spring 128. An initial portion of fluid is returned rapidly to cylinder 16 as indicated by pressure curve portion 193 while valve member 141 is being moved upwardly in passage 137. After valve member 141 has been moved to its upper position, the nose portion 142 is in close proximity to conical seat 147 defining a restricted orifice which meters the flow of the remainder of the fluid toward brake cylinder 16. FIG. 5 shows the position of valve member 141 during metered flow toward brake cylinder 16. Pressure curve portion 196 represents the pressure rise characteristics in the brake cylinder during such metered flow.

The performance characteristics of spring motor 97 during the fluid release and fluid return strokes are represented in graphical form in FIGS. 7c and 7d. During the cocking or fluid release stroke 198, diaphragm spring 128 initially provides a substantially constant or slightly rising resistance as indicated by the curve portion 168, followed by decreasing resistance throughout the major portion of the stroke as movement occurs in the cocking direction indicated by the curve portion 167. Near the end of the cocking stroke auxiliary spring 129 provides increasing resistance as indicated by the curve portion 166. After a short time delay caused by the decaying flux field in the solenoid which is equivalent to pressure curve portion 191, spring motor 97 drives the armature 102 and piston 91 through a fluid return stroke 199. During a first increment of time represented by curve portion 166', auxiliary spring 129 releases its stored energy to the armature and piston for quickly returning a portion of the fluid to the wheel cylinder and moving valve member 141 upwardly in passage 137. Thereafter, diaphragm spring 128 provides an increasing force for driving fluid through the restricted orifice toward brake cylinder 16 during an increment of time indicated by curve portion 167'. Near the end of the return stroke, diaphragm spring 128 exerts a substantially constant force for reapplying the brakes as indicated by the increment 168'.

It is to be noted that the graphical representations of system performance discussed above, illustrate a particular braking event involving a combination of speed and road surface conditions. In practice, the system is designed to function throughout a wide range of speed and road conditions resulting in corresponding variations in system performance. For example, on a dry road surface, a locked wheel condition would be expected to occur at high brake pressures, in which case the high brake pressure acting on piston 91 would provide more assistance for the solenoid 102 in initiating the fluid release stroke. On the other hand, a locked wheel condition can occur on an ice covered road surface at low brake pressure, in which case the solenoid would receive less assistance from the brake fluid in initiating the release stroke.

ELECTRONIC CONTROL SYSTEM

General arrangement

FIG. 8 shows the general layout of the control system for actuating solenoid winding 101 after brake switch 29 is first closed and thereafter sensor switch 21 is actuated responsive to being subjected to deceleration forces of the predetermined value. Terminals 200 and 201 represent an input circuit for receiving a potential difference to energize the circuit of FIG. 8. When brake switch 29 is actuated from the open to the closed position, a positive, voltage is applied from terminal 200 over conductor 202, the contacts of brake switch 29, and conductor 203 to the upper input terminal of latching circuit 204. As the vehicle wheel on which switch 21 is mounted decelerates to the predetermined value, sensor switch 21 is closed so that a reference or ground potential is applied from terminal 201 over conductor, contacts 58 and 59 of switch 21, and conductor 62 to the lower input terminal of latching circuit 204. This latching circuit is of the type, as will be explained hereafter in connection with FIG. 9, that is actuated when both switches 29 and 21 are closed and thereafter provides a constant energizing potential over conductor 207 to trigger circuit 210 so long as brake switch 29 remains actuated or closed. Repeated opening and closing of sensor switch 21 does not affect the provision of the output signal from latching circuit 204 after the first closure of sensor switch 21.

SCR relay circuit 211 cooperates with trigger circuit 210, over conductor 209, to form a firing circuit 212. When the output signal is initially provided on conductor 207 from the latching circuit, firing circuit 212 completes a circuit for current flow from energizing conductor 213 through resistor 214 and solenoid winding 101 to SCR relay circuit 211. As explained previously energization of the solenoid effects a movement within the cylinder which decreases the fluid pressure to reduce the braking force, thus reducing the deceleration of the wheel so that the angular velocity of the wheel begins to increase. Although the increase in wheel speed may effect an opening of sensor switch 21, as noted above this action is ineffective to remove the output signal from latching circuit 204.

As current flows through solenoid winding 101 and resistor 214, a sample of this current flow is taken over a voltage divider circuit which includes a resistor 215 coupled to the input circuit of an analog voltage amplifier 216. The amplified voltage from stage 216 is applied over conductor 217 to a differentiating circuit 218. To understand more fully the cooperation of differentiating circuit 218 in this complete system, it will be helpful to consider characteristics of a solenoid in normal operation.

FIG. 9a illustrates the increase of current with respect to time through a solenoid winding subsequent to a time $t0$ at which an energizing potential difference is aplied across the solenoid winding. The initial sloping portion 360 of the curve shown in solid line represents the initial current rise, and the time duration between $t0$ and $t1$ depicts the span of time during which the solenoid armature remains stationary in the open gap position.

At time t1 the armature begins to move and at approximately time t2, experimental data indicates that the back electromotive force (EMF) is sufficient in magnitude to offset a portion of the energizing voltage so that the solenoid current begins to decrease as shown by the curve portion 361. At time t3 the solenoid armature reaches the end of its stroke and thus terminates generation of the back EMF, allowing the current to terminate its decrease and again and again begin to increase, as shown by line 362, toward the stalled current level represented by curve portion 363. The point 364 at which the decrease of current terminates, coincident with termination of armature displacement, and again begins to increase is termed "the maximum dip" point for purposes of our present explanation and understanding of the invention. The dip 361 and subsequent increase 362 of the solenoid winding current is in marked contradistinction to the broken line curve portion 365 which represents the gradient of current increase through a "pure" inductance; that is, a winding with no moving armature and only the negligible resistance of the winding itself to retard the build-up of the field as the current increases toward the stalled current value.

FIG. 9b shows movement of the armature, or more precisely the extent of the open area or gap between the armature and the adjacent portion of the magnetic circuit between the time t0 at which the solenoid is energized until the time at which the solenoid armature reaches the closed or minimum gap position. As current initially builds up the armature stays in the open gap position, represented by curve portion 366, until time t1. Thereafter the armature begins to move and the gap decreases as shown by curve portion 367, until at time t3 the gap is completely closed. It is again emphasized that this closed gap position occurs in time coincidence with occurrence of the maximum dip point 364.

It is important to appreciate that at this maximum dip point 364 the useful work has been accomplished by the solenoid and no advantage can be gained by passing additional energy into the winding and allowing the current to increase toward the stalled current level. It is also emphasized that at this maximum dip point 364, the back EMF has terminated and thus, if the solenoid were to be deenergized at this time, the only field which would have to collapse is that created by the minimum level current flow through the winding. With this explanation of solenoid operation in mind, the action of differentiating circuit 218 will be considered.

In accordance with a significant aspect of the present invention differentiating circuit 218 is connected to apply an output pulse over line 220 at time t3 to a monostable multivibrator circuit 221, when the "maximum dip" point of the solenoid current is sensed. Upon receipt of the pulse the differentiating circuit 218, multivibrator circuit 221 commences generating a square-wave output voltage pulse 226, the leading edge 227 of which is determined in time by the signal received from differentiating circuit 218. The trailing edge 228 of the square-wave pulse occurs at time t5, being regulated by the effective values of the circuit components within multivibrator 221. This square-wave type pulse 226 is passed over line 222 and amplified in monostable pulse amplifier 223, whence the amplified pulse passes over line 224 to another input portion of trigger circuit 210. When the leading edge 227 of this pulse is applied to trigger circuit 210 in the firing circuit 212, SCR relay circuit 211 is regulated to interrupt current flow through the solenoid winding and thus allow the brakes to increase the braking pressure. When the trailing edge 228 of the control pulse is received at circuit 210, SCR relay circuit 211 again completes a path for current flow through solenoid winding 101. Accordingly the recommencing of current flow through the solenoid winding is again sensed and amplified in analog voltage amplifier 216 to initiate another cycle of operation in cut-off and timer circuit 225, to produce another control pulse 226 on conductor 224. It is manifest that it is only the circuit arrangement within cut-off and timer circuit 225, which includes the stages 216, 218, 221 and 223, which determines the characteristics of the regulating pulse 226. Each sequential energization and deenergization of the solenoid to selectively pulse the braking system is independent of the actual wheel deceleration, once sensor switch 21 has initially been closed.

ELECTRONIC CONTROL SYSTEM

Latching circuit and trigger circuit

FIG. 10 shows the latching circuit 204 and the trigger circuit 210, together with conductors 203 and 62 over which signals are received from the brake and sensor switches. The sensor signal is received over conductor 62 and applied over resistor 230 to the base of a PNP type transistor 231. Those skilled in the art will appreciate that substitutions and variations can readily be made, such as substituting an NPN type transistor for a PNP type with the concomitant polarity reversal of the energizing and signal voltages. Likewise vacuum tubes can replace the transistors in systems where heavy current drain and mechanical vibrations are not limiting requirements.

Another resistor 232 is coupled between terminal 200 and the common junction between resistor 230 and the base of transistor 231. The emitter of this transistor is coupled to terminal 200, as is the anode of a latching silicon controlled rectifier (SCR) 233. This switch or controlled rectifier also includes a gate element coupled through a resistor 234 to the collector of transistor 231, and the gate is also coupled through another resistor 235 to the cathode of the SCR. This cathode is also coupled to the collector of an NPN type transistor 236. Resistor 237 is coupled between the base and emitter of transistor 236, and the emitter is also coupled to conductor 207. A dropping resistor 240 is coupled between conductor 203 and the base of transistor 236.

In the left-hand portion of SCR trigger circuit 210, conductor 224 provides a path for receiving the amplified pulse signals 226 produced by cut-off and timer circuit 225. A voltage divider circuit including resistors 242 and 243 is coupled between input conductor 224 and ground conductor 244. PNP type transistor 245 has its base coupled to the junction between resistors 242 and 243, and its collector coupled to ground conductor 244. Its emitter is coupled to one side of resistor 246, the other side of which is coupled to conductor 207, and the emitter of transistor 245 is also coupled to the base of an NPN type transistor 247. The collector of this transistor is coupled through a resistor 248 to conductor 207, and the emitter of transistor 247 is coupled through a diode 250 to ground conductor 244.

Terminal 251 designates the common connection between the collector of transistor 247, resistor 252 and the anode of diode 253. The cathode of this diode is coupled through a resistor 254 to conductor 244, and a series circuit including a capacitor 255 and a resistor 256 is coupled in parallel with resistor 254. Another series circuit comprising a diode 257 and a resistor 258 is coupled between the base of an NPN transistor 260 and the common connection between capacitor 255 and resistor 256. The collector of transistor 260 is coupled to energizing conductor 207, and its emitter is coupled both through a resistor 261 to ground conductor 244, and over conductor 209A to relay circuit 211.

NPN type transistor 262 has its base coupled to one side of resistor 252, its emitter coupled to ground conductor 244, and its collector coupled through resistor 263 to conductor 244, and its collector coupled through resistor 263 to conductor 207 and also to the anode of another diode 264, the cathode of which is coupled through a resistor 265 to ground. A series circuit comprising a capacitor 266 and a resistor 267 is coupled in parallel with resistor 265, and another series circuit comprising a diode 268 and a resistor 270 is coupled between the base of NPN transistor 271 and the common connection between capacitor 266 and resistor 267. The collector of transistor 271 is coupled to energizing terminal 200, and its emitter is coupled through a resistor 272 to ground. A diode 273 is coupled between energizing terminal 200 and ground conductor 244. Conductor 209B extends a connection from the emitter of transistor 271 to relay circuit 211.

In operation, considering first latching circuit 204, initially brake switch 29 and sensor switch 21 are open and transistor 231, SCR 233 and transistor 236 are nonconducting. When the braking system of the wheeled vehicle is actuated, switch 29 is closed and a positive unidirectional potential is applied over conductor 203 and resistance 240, both to the base of transistor 236 and to one side of resistor 237. Because SCR 233 is nonconducting there is no energizing potential applied to the collector of transistor 236; thus, notwithstanding the positive potential applied to its base, transistor 236 remains nonconductive.

Charging current flows through resistors 240 and 237, and over conductor 207, resistor 248, diode 253, capacitor 255 and resistor 256 to ground. The values of the circuit components, including capacitor 255 and the other elements in this charging circuit, found suitable to practice the invention will be set out at the end of the specification. In a preferred embodiment the RC time constant of this charging circuit was made very small, less than one millisecond. Thus capacitor 255 is charged almost immediately after the brake switch is closed and well before any wheel can decelerate sufficiently to actuate sensor switch 21.

Thereafter as the deceleration level of the wheel on which switch 21 is attached exceeds a predetermined level, the sensor switch is closed and ground potential is applied over conductor 62 and resistor 230 to the base of PNP type transistor 231. This transistor is rapidly switched on and provides a turn-on signal over resistor 234 to the gate of SCR 233, which commences to conduct and applies positive voltage to the collector of transistor 236. Because a positive voltage was already present at the base of transistor 236, this transistor immediately conducts and thus the positive voltage at terminal 200 is passed, with only a negligible voltage drop, through SCR 233 and transistor 236 to conductor 207, to energize trigger circuit 210. Because SCR 233 can be switched on by the injection of carriers at its gate and thereafter any signal at the gate is ineffective to interrupt conduction of this solid state switch, subsequent opening of sensor switch 21 will not remove the energizing potential from conductor 207. So long as brake switch 29 remains closed, this positive potential is applied over conductor 207 to energize trigger circuit 210.

Because of the relatively high resistance offered by resistors 237, 240 in the latching circuit, the level of the potential first applied to conductor 207 when capacitor 255 is initially charged is not sufficient to produce conduction of transistor 260. With capacitor 255 charged, and resistor 248 of a suitably smaller ohmic value than resistor 256, the potential appearing at the base of transistor 260 is positive relative to that at the emitter of this transistor. Thus as soon as the sensor switch closes to turn on SCR 233 and transistor 236, applying the requisite energizing potential to conductor 207, transistor 260 is switched on and a first trigger pulse 275 is developed across resistor 261 as this transistor conducts. This pulse, developed at time $t0$ in relation to pulse 226 in FIG. 8, is translated over conductor 209A to relay circuit 211 to effect current flow through solenoid winding 101 and reduce the fluid pressure in the braking system, to avoid locking up the brakes and sending the vehicle into a skid.

At time $t3$ leading edge 227 of the square wave pulse 226 is received over conductor 224 at the input portion of trigger circuit 210. The generation of the pulse 226 will be explained hereinafter. For the present it is sufficient to note the positive-going leading edge of this waveform is applied over the voltage divider arrangement 242, 243 in the left-hand portion of trigger circuit 210 to the base of transistor 245.

This positive-going signal switches off transistor 245 and the potential at the base of transistor 247b rapidly goes positive, gating on transistor 247. The voltage drop across resistor 248 increases to apply a negative-going potential to the base of transistor 262; this pulse is shown above terminal 251. Transistor 262 is cut-off, and the voltage at its collector is a positive-going pulse as shown by waveform 278. This signal is applied over diode 264, capacitor 266, diode 268 and resistor 270 to the base of transistor 271, gating this transistor on. As transistor 271 conducts at time $t1$ the positive-going pulse 276 developed across resistor 272 is applied over conductor 209B to the relay circuit 211 to terminate current flow through solenoid winding 101, thus reapplying the braking pressure.

Thereafter at time $t5$ the trailing edge or negative-going portion 228 of pulse 226 is received over conductor 224, transistor 245 is again switched on and transistor 247 is turned off. Thus the potential at junction 251 rapidly goes positive, providing a signal at the base of transistor 260 which switches this transistor on to pass another trigger pulse 277 over conductor 209A to relay circuit 211. The same positive-going signal turns on transistor 262, which in turn switches off transistor 271. Thus those skilled in the art will appreciate that any suitable pulse-generating arrangement can be utilized in the cut-off and timer circuit 225 to provide the requisite pulse 226 for operating the trigger circuit after latching circuit 204 has been energized by actuation of switches 21 and 29.

ELECTRONIC CONTROL SYSTEM

SCR relay circuit, cut-off and timer circuit

FIG. 11 depicts SCR relay circuit 211, solenoid winding 101, and the first two stages 216, 218 of the cut-off and timer circuit 225. In the left-hand portion of this drawing a diode 280 is coupled in parallel with solenoid winding 101, between conductors 103 and 104. SCR relay circuit 211 also comprises a resistor 281 having an upper connection coupled to conductor 282 and a lower connection coupled both to one plate of a commutating capacitor 283 and to the anode of turn-off SCR 284. The gate of this SCR is coupled over conductor 209B to the emitter of transistor 271 in the SCR trigger circuit 210 (FIG. 10), and the cathode of SCR 284 is coupled to ground conductor 244. The other plate of capacitor 283 is coupled to the anode of turn-on SCR 285, which has its cathode coupled to ground. The gate of this switch 285 is coupled over conductor 209A to the emitter of transistor 260 in the SCR trigger circuit 210.

In analog voltage amplifier 216, energizing conductor 213 is coupled through a low resistance shunt 214 to conductor 282. Reference conductor 286 is coupled through another resistor 287 to ground. A voltage divider comprising the series connection of resistors 215 and 288 is coupled between conductors 282 and 286, so that a signal proportional to the level of current flows through the solenoid winding 101 is applied to the base of PNP type transistor 290 in the analog voltage amplifier. The emitter of the transistor is coupled through a resistor 291 to reference conductor 286. A parallel-connected combination of capacitor 292 and resistor 293 is coupled between the collector of transistor 290 and the base of the other PNP type transistor 294 in the analog voltage amplifier. A resistor 295 is coupled between this base and conductor 213, and the emitter of transistor 294 is coupled directly to conductor 213. The collector of this transistor is coupled through a resistor 296 to reference conductor 286, so that the voltage developed across resistor 296 as the output signal of analog voltage amplifier 216 is applied over conductor 217 as the input signal to differentiating circuit 218.

In the differentiating circuit conductor 217 is coupled through a capacitor 298 to the base of an NPN type transistor 300, and conductor 217 is also coupled through capacitor 301 to reference conductor 286. A diode 302 is coupled between this reference conductor and the common connection between capacitor 298 and the base of transistor 300. The emitter of this transistor is coupled directly to conductor 286, and its collector is coupled through a resistor 303 to conductor 213. A capacitor 304 is coupled between the collector of transistor 300 and ground, and a resistor 305 is coupled between that collector and the base of a PNP type transistor 306. A diode 307 is coupled between conductor 213 and the emitter of transistor 306, and its collector is coupled through a resistor 308 to reference conductor 286. The base of an NPN type transistor 310 is coupled to the collector of transistor 306, and the collector of transistor 310 is coupled directly to conductor 213. The emitter of transistor 310 is coupled through a resistor 311 to reference conductor 286, and the signal developed across this resistor is passed over coupling capacitor 312 to output conductor 220 of differentiating circuit 218. A resistor 314 and a diode 315 are coupled in parallel between conductors 220 and 286.

In FIG. 12, at the input side of monostable multivibrator circuit 221 the signal on conductor 220 is applied through a diode 316 to the base of another NPN type transistor 317, which has its emitter coupled directly to conductor 286. A composite resistance which in the illustrated embodiment includes a fixed resistor 318 coupled in series with a potentiometer 320 is shown coupled between conductor 213 and the common connection between diode 316 and the base of transistor 317. Those skilled in the art will appreciate that the illustrated arrangement includes an adjustable component only to vary the effective time duration or pulse width of the pulse 226, thus to regulate the effective off time or nonconduction time of the solenoid itself. In actual production when the physical characteristics of the vehicle and braking system into which this control system is to be inserted are known, the optimum off-time value is selected and resistor 318 and potentiometer 320 are replaced by a single fixed resistance to produce the desired width (or time duration) of pulse 226.

Another resistor 321 is coupled between conductor 213 and the collector of transistor 317, and a conductor 322 is coupled to the common connection between this resistor and collector to extend the output signal from multivibrator circuit 221 over a resistor 323 and conductor 222 to the monostable pulse amplifier circuit 223. Another resistor 324 is coupled between the base of transistor 317 and a terminal 325, and a diode 326 is coupled between this terminal and reference conductor 286. A resistor 331 is connected between the base and emitter of transistor 330, and a resistor 332 is coupled between the base of this transistor and the collector of transistor 317. Another NPN type transistor 333 in the multivibrator circuit has its emitter coupled through a resistor 334 to the reference conductor, and its collector coupled to energizing conductor 213. Its base is coupled to the collector of transistor 330, and this collector is also coupled through a resistor 335 to conductor 213.

In monostable pulse amplifier 223 input conductor 222 is coupled to the base of NPN type transistor 336, whose emitter is coupled to reference conductor 286. Its collector is coupled through a resistor 337 to conductor 213, and the collector is also coupled through a series circuit including resistor 338 and a capacitor 340 to conductor 286. A resistor 341 is coupled between the base of an NPN type transistor 342 and the junction between resistor 338 and capacitor 340. The collector of transistor 342 is coupled directly to conductor 213, and its emitter is coupled both through a resistor 343 to reference conductor 286, and through a series circuit including a diode 344 and a resistor 345 to the base of another NPN type transistor 346, the emitter of which is connected directly to reference conductor 286. Its collector is coupled through a resistor 347 to conductor 213, and output conductor 224 is coupled to the junction between resistor 347 and the collector of transistor 346. Thus the output signal developed across resistor 347 is extended over conductor 224 to the input portion of trigger circuit 210, as shown generally in FIG. 8, and in more detail in the left-hand portion of FIG. 10.

A Zener diode 348 is coupled between conductors 213 and 286 to regulate the voltage level between the energizing and reference conductors, and a capacitor 350 is coupled in parallel with diode 348.

In operation the first energization of transistor 260 (FIG. 10) produces a signal 275 over conductor 209A to the gate of SCR 285, to charge this capacitor. At time $t3$ the action described above in connection with FIG. 10 occurs and signal 276 is passed from transistor 271 over conductor 209b to the gate of turn-off SCR 284, switching this SCR on. The accumulated voltage on capacitor 283 is thus applied across SCR 285 with a reverse polarity to turn SCR 285 off. Thereafter capacitor 283 rapidly charges with a voltage of the opposite polarity to turn off SCR 284 when the next trigger pulse 277 is applied to the gate of SCR 285. This alternate conduction of the SCR's 285 and 284 and the commutating action of the circuit including capacitor 283 will readily be understood by those skilled in the art.

A signal proportional to the level of current flow through solenoid winding 101 is applied across the voltage divider circuit including resistors 215, 288 at the input portion of analog voltage amplifier 216. This signal is amplified in transistor 290 to provide a signal approximately of the waveform 351 shown below the collector of transistor 290. The illustrated signal is applied to the circuit 292, 293 and amplified in transistor 294 to pass a signal similar to waveform 352 over conductor 217 to the differentiating circuit. This waveform indicates the initial rise of current in the solenoid winding, its decline to a "maximum dip" at time $t3$, and its tendency to begin to increase toward the saturation or stalled current level.

In differentiating circuit 218, the output signal from transistor 300 is a negative-going pulse 353 occurring at time $t3$, signifying the "maximum dip" area of the change in current flow through the solenoid winding. This pulse 353 is inverted in stage 306 and passed through stage 310, where it is limited and provides a negative-going pulse at approximately time $t3$ as shown by waveform 354. This signal is passed through capacitor 312 and over line 220 to the multivibrator circuit 221.

After passing through diode 316 the waveform of the signal is that identified by 355, and this signal is used to trigger operation of the "one-shot" circuit 221 to produce the square-wave pulse 356. This pulse is passed over conductor 322, resistor 323 and conductor 222 to the first stage 336 in pulse amplifier 223. The amplifier stage 223 is effective to produce the output pulse 226, shown just above output conductor 224 which passes the square-wave signal to the trigger circuit.

It is important to note that the timing of the square-wave pulse 226, including the determination of the leading and trailing edges 227, 228 at times $t3$ and $t5$, is a function only of the circuitry shown generally in FIG. 8 and in more detail in FIGS. 11 and 12. This all-electronic regulation of the fluid removal and return in the braking system produces successive, rapid recycling of the system, always removing the braking pressure well before skid conditions could occur and reapplying the pressure to obtain an optimum braking action and halt the vehicle to the shortest possible distance.

To achieve compatability with existing vehicle systems, a preferred embodiment of the invention was constructed to operate from the 12 volt D-C potential difference available in most automobiles and trucks. That is, the positive terminal 200 of the circuit shown in FIGS. 8 and 10–12 can be coupled to the positive terminal of a 12 volt battery, and the ground terminal 201 can be coupled to the negative battery terminal. Solely to assist those skilled in the art to practice the invention with a minimum of experimentation, a table of circuit values and component identifications found suitable to operate the illustrated system is set out below. In no sense is this illustrative table to be considered a limitation on the scope of the invention, which is defined only by the appended claims.

| Component: | Identification |
|---|---|
| 233 | C106Y1 |
| 236 | 2N1711 |
| 284 | 2N1469 |
| 285 | 2N2023 |
| 231, 245, 290, 294, 306 | 2N1132 |
| 247, 262, 300, 310, 317, 330, 333, 336, 342, 346 | 2N2923 |
| 260, 271 | 2N1711 |
| 250, 273, 307, 316, 326, 328 | A14C |
| 253, 257, 264, 268, 302, 315, 344 | 1N270 |
| 348 | 1N2973 |

| | Resistance in ohms |
|---|---|
| 320 | 0–50K |
| 230, 232, 234, 235, 237, 240, 248, 263, 303, 308, 311, 321, 335, 337, 347 | 1K |
| 242 | 150K |
| 215, 243, 246, 332, 338 | 10K |
| 252 | 22K |
| 254, 288 | 100K |
| 256, 267, 331, 334, 341, 343 | 5.6K |
| 258, 270 | 820 |
| 261, 272 | 680 |
| 265 | 47K |
| 214 | 0.001 |
| 287 | 15 |
| 291 | 2.7K |
| 293 | 82K |
| 295 | 56K |

| | Capacitance in microfarads |
|---|---|
| 255, 266, 340 | 0.1 |
| 292 | 0.12 |
| 298, 301, 312 | 0.22 |
| 304 | 2.0 |
| 327 | 5.0 |
| 350 | 100 |

Although only a particular embodiment of the invention has been shown and described, it will be apparent to those skilled in the art that various changes and modifications may be made therein without departing from the invention in its broader aspects. Therefore the aim in the appended claims is to cover all such changes and modifications as may fall within the true spirit and scope of the invention.

We claim:

1. In a braking system for a wheeled vehicle, having a wheel provided with braking members arranged for applying braking force thereto by means of a fluid pressure actuated brake cylinder, including a fluid pressure circuit connected between said brake cylinder and a source of fluid pressure for selectively pressurizing said brake cylinder, said vehicle having a deceleration sensor operatively associated therewith effective to provide a signal in response to an incipient locked wheel condition; improved skid inhibiting means effective to control the braking force applied to said wheel comprising: fluid pressure modulating apparatus connected to said circuit for operation in response to a signal from said sensor providing repeated regulation of the pressure exerted in said brake cylinder, said pressure modulating apparatus including an expansion chamber having reciprocable fluid transfer means disposed therein movable through a fluid release stroke in one direction for releasing a quantity of fluid from said brake cylinder and a fluid return stroke in an opposite direction for returning said quantity of fluid toward said brake cylinder and a variable flow restrictor device including a movable valve member disposed between said expansion chamber and said brake cylinder, said valve member being movable in a first direction defining an enlarged aperture permitting rapid flow of fluid from said brake cylinder toward said expansion chamber in response to impingement thereon of fluid flowing from said brake cylinder, said valve member being movable in a second direction defining a restricted aperture for metering flow from said expansion chamber toward said brake cylinder in response to impingement thereon of fluid flowing from said expansion chamber.

2. In a braking system according to claim 1, said movable valve member being biased in said first direction defining an enlarged aperture permitting relatively rapid return of a portion of said quantity of fluid to said brake cylinder, and including means effective to move said valve member in said second direction restricting said aperture in response to flow of said portion of said quantity of fluid toward said brake cylinder for metering the return of the remainder of quantity of fluid to said brake cylinder.

3. In a braking system according to claim 2, said movable valve member being arranged and disposed in cooperating relationship with a pair of sleeve members, one of said sleeve members including an abutment engageable with a first portion of said valve member for limiting movement thereof in said second direction, said abutment and first valve portion limiting the portion of fluid returned rapidly to said brake cylinder, and the other of said sleeve members cooperating with a second portion of said valve member for restricting said aperture when said valve is in engagement with said abutment providing metered flow of the remainder of said fluid toward said brake cylinder.

4. In a braking system according to claim 3, said sleeve members being mounted for adjustment relative to each other, providing means for selecting the pressure rise characteristics in said brake cylinder during the return of fluid thereto.

5. In a braking system for a wheeled vehicle, having a wheel provided with braking members arranged for applying braking force thereto by means of a fluid pressure actuated brake cylinder, including a fluid pressure circuit connected between said brake cylinder and a source of fluid pressure for selectively pressurizing said brake cylinder, said vehicle having a deceleration sensor operatively associated therewith effective to provide a signal in response to an incipient locked wheel condition; improved skid inhibiting means effective to control the braking force applied to said wheel comprising: fluid pressure modulating apparatus connected to said circuit for operation in response to a signal from said sensor providing repeated regulation of the pressure exerted in said brake cylinder, said pressure modulating apparatus including an expansion chamber having reciprocable fluid transfer means disposed therein movable through a fluid release stroke in one direction for releasing a quantity of fluid from said brake cylinder and a fluid return stroke in an opposite direction for returning said quantity of fluid toward said brake cylinder, and drive means engageable with said fluid transfer means including a spring motor having a compound spring rate providing a driving force of increasing magnitude during one portion of said fluid return stroke and providing substantially constant driving force during a terminal portion of said fluid return stroke.

6. In a braking system according to claim 5, said spring motor having a compound spring rate providing decreasing driving force during an initial portion of said fluid return stroke.

7. In a braking system according to claim 5, said spring motor including a diaphragm spring biasing said fluid transfer means throughout said return stroke movement, and auxiliary resilient means biasing said fluid transfer means during an initial portion of said fluid return stroke.

8. In a braking system for a wheeled vehicle, having a wheel provided with braking members arranged for applying braking force thereto by means of a fluid pressure actuated brake cylinder, including a fluid pressure circuit connected between said brake cylinder and a source of fluid pressure for selectively pressurizing said brake cylinder, said vehicle having a deceleration sensor operatively associated therewith effective to provide a signal in response to an incipient locked wheel condition; improved skid inhibiting means effective to control the braking force applied to said wheel comprising: fluid pressure modulating apparatus connected to said circuit for operation in response to a signal from said sensor providing repeated regulation of the pressure exerted in said brake cylinder, said pressure modulating apparatus including reciprocable fluid transfer means movable through a fluid release stroke and a fluid return stroke, having drive means engageable therewith effective to drive said transfer means during said fluid return stroke, said drive means including a spring motor and solenoid means connected thereto, said solenoid means having an armature urged in release stroke direction by means of a magnetic flux field generated in response to an incipient locked wheel signal, providing increasing driving force as movement occurs in said release stroke direction, and said spring motor including a negative rate spring arrangement providing decreasing resistance as movement occurs in said release stroke direction, said flux field and negative rate spring arrangement providing for accelerated movement of said armature in said release stroke direction.

9. In a braking system according to claim 8, said spring motor including auxiliary resilient means providing increased resistance to movement of said armature during a terminal portion of movement in said release stroke direction, said auxiliary resilient means absorbing the kinetic energy provided by accelerated movement of said armature, and restoring said kinetic energy to said armature for rapid initiation of said fluid return stroke.

10. In a braking system for a wheeled vehicle, having a wheel provided with braking members arranged for applying braking force thereto by means of a fluid pressure actuated brake cylinder, including a fluid pressure circuit connected between said brake cylinder and a source of fluid pressure for selectively pressurizing said brake cylinder, said vehicle having a deceleration sensor operatively associated therewith effective to provide a signal in response to an incipient locked wheel condition; improved skid inhibiting means effective to control the braking force applied to said wheel comprising: fluid pressure modulating apparatus connected to said circuit for operation in response to a signal from said sensor providing repeated regulation of the pressure exerted in said brake cylinder, said pressure modulating apparatus including reciprocable fluid transfer means movable through a fluid release stroke and a fluid return stroke having drive means engageable therewith effective to drive said transfer means through said fluid return stroke, said drive means including a spring motor and an electromagnetic motor connected thereto effective to drive said spring motor in a release stroke direction, and control means including a pulse generating circuit connected to said electromagnetic motor, said control means providing a preprogrammed sequence of repeated actuations of said drive means and fluid transfer means in response to an initial incipient locked wheel signal from said sensor, said sequence of actuations providing variation in the braking force applied to said wheel for maintaining the angular velocity of said wheel within a preselected slip range corresponding with a desired range of wheel to road adhesion values.

11. A braking system as claimed in claim 10 in which said electromagnetic motor includes a solenoid winding and in which said control means includes:
   a latching circuit connected to produce an output signal responsive to actuation of the brake switch which initiates said braking force and to actuation of said deceleration sensor;
   a firing circuit, coupled between the latching circuit and said solenoid winding, for initially energizing the solenoid winding when the first output signal is provided by the latching circuit;
   circuit means coupling said pulse generating circuit between said solenoid winding and said firing circuit, to initiate a single actuation of said fluid transfer means each time the solenoid winding is energized and to deenergize the solenoid winding at the end of each cycle provided by the pulse generating circuit; and
   means for applying an energizing potential difference to said control means.

12. A control system for regulating the deceleration of a wheeled vehicle in which a first switch is actuated responsive to application of a braking force and a second switch is actuated when the deceleration level exceeds a predetermined value, comprising:
   a latching circuit having a pair of input terminals coupled respectively to said first and second switches, and connected to produce an output signal responsive to actuation of said first and second switches, and to maintain said output signal notwithstanding successive opening and closing of said second switch so long as the first switch remains actuated;
   a solenoid, including a winding, connected to modify the braking and deceleration of the vehicle responsive to energization of the solenoid winding;
   a firing circuit, coupled between said latching circuit and said solenoid winding, connected to energize said solenoid winding when the first output signal is provided by said latching circuit;
   a cut-off and timer circuit, coupled between said winding and said firing circuit, connected to initiate a timing cycle of predetermined duration each time the solenoid winding is energized and, at the expiration of said timing cycle, to pass a signal to said firing circuit which effects deenergization of the solenoid; and
   means for applying an energizing potential difference to the control system.

13. A control system as claimed in claim 12 in which said cut-off and timer circuit comprises:
   an analog circuit, coupled to said solenoid winding, connected to provide a signal which is a function of current flow through said winding;
   a differentiating circuit connected to receive said signal from the analog circuit, and to provide a timing signal responsive to occurrence of a predetermined characteristic of said signal received from the analog circuit; and
   a pulse generating circuit, connected to initiate a regulating pulse at a time determined by receipt of the timing signal from the differentiating circuit, and to terminate said regulating pulse at a time determined by circuit values within the pulse generating circuit itself, to provide said regulating pulse signal which is passed to the firing circuit for regulating cycling of the solenoid.

14. A control system as claimed in claim 12, in which said latching circuit includes a first semiconductor switch, connected to be conditioned for operation responsive to actuation of said first switch, a second semiconductor switch coupled in series between said first semiconductor switch and said means for applying an energizing potential difference to the control system, and a third semiconductor switch, connected to gate on said second semiconductor switch responsive to actuation of said second switch so that the second semiconductor switch passes the energizing potential difference through said latching circuit to at least a portion of said firing circuit.

15. A control system for regulating the deceleration of a wheeled vehicle in which a brake switch is first actuated as a braking force is applied, and a sensor switch is thereafter actuated when the deceleration level exceeds a predetermined value, which system comprises:
- a latching circuit having a pair of input terminals respectively coupled to said brake and sensor switches, and connected to produce an output signal responsive to actuation of both said brake and sensor switches and to maintain said output signal notwithstanding successive opening and closing of the sensor switch so long as the brake switch remains actuated;
- a solenoid, including a winding, connected to reduce the braking force to obviate skidding of the vehicle responsive to current flow through the solenoid winding, and to afford the reapplication of the braking force responsive to interruption of said current flow;
- a firing circuit, having a first input connection coupled to said latching circuit, a second input connection, and an output connection coupled to said solenoid winding, which firing circuit is connected to pass current through said solenoid winding when said output signal is provided by the latching circuit;
- a cut-off and timer circuit, coupled between said solenoid winding and said second input connection of said firing circuit, connected to initiate a timing cycle of predetermined duration each time the solenoid completes its stroke after the winding is energized, to de-energize the solenoid and allow the braking pressure to increase at the beginning of said cycle, and, at the termination of said cycle, to pass a signal to said firing circuit to re-establish current flow through the solenoid winding and thus initiate another cyclic operation of the control system; and
- means, including a pair of input connections, for applying an energizing potential difference to the control system.

16. A control system as claimed in claim 15 in which said latching circuit includes a first transistor connected to be conditioned for conduction when said brake switch is closed, a silicon controlled rectifier coupled in series with said first transistor between said firing circuit and one of said input connections to which the energizing potential difference is applied, and a second transistor connected for conduction responsive to actuation of said sensor switch and to provide a gating signal to said silicon controlled rectifier, which in turn conducts and energizes said first transistor to complete an energizing path from said one input connection to said firing circuit.

17. A control system as claimed in claim 15 in which said firing circuit includes a trigger circuit, comprising said first and second input connections, for producing trigger signals responsive to receipt of the signal over said second input connection from the cut-off and timer circuit, and a relay circuit connected to complete and interrupt a path for current flow through said solenoid winding responsive to receipt of the trigger signals from said trigger circuit.

18. A control system as claimed in claim 15 in which said cut-off and timer circuit comprises:
- an analog voltage amplifier for producing an amplified signal related to the level of current flow through said solenoid winding;
- a differentiating circuit connected to receive said amplified signal and to provide a timing signal as the solenoid winding current passes through the maximum dip condition; and
- a pulse generating circuit, connected to receive said timing signal from the differentiating circuit and produce the leading edge of a square-wave pulse which is applied to said second input connection of the firing circuit to interrupt current flow through said solenoid winding, and at the expiration of a predetermined time interval, to produce the trailing edge of said square-wave pulse which is applied to said second input connection of the firing circuit to reestablish current flow through said solenoid winding and thus initiate another cyclical operation of the control system.

References Cited

UNITED STATES PATENTS 3,245,727  4/1966  Anderson et al. __ 303—21(A4)
3,441,320  4/1969  Flory _____ 188—181(A)X DUANE A. REGER, Primary Examiner U.S. Cl. X.R.

303—20